M. C. WHITE.
COMPRESSION METER.
APPLICATION FILED APR. 23, 1921.

1,437,830.

Patented Dec. 5, 1922.
2 SHEETS—SHEET 1.

Inventor
Morris C. White
By Arthus L. Slee
Atty.

M. C. WHITE.
COMPRESSION METER.
APPLICATION FILED APR. 23, 1921.
1,437,830.
Patented Dec. 5, 1922.
2 SHEETS—SHEET 2.
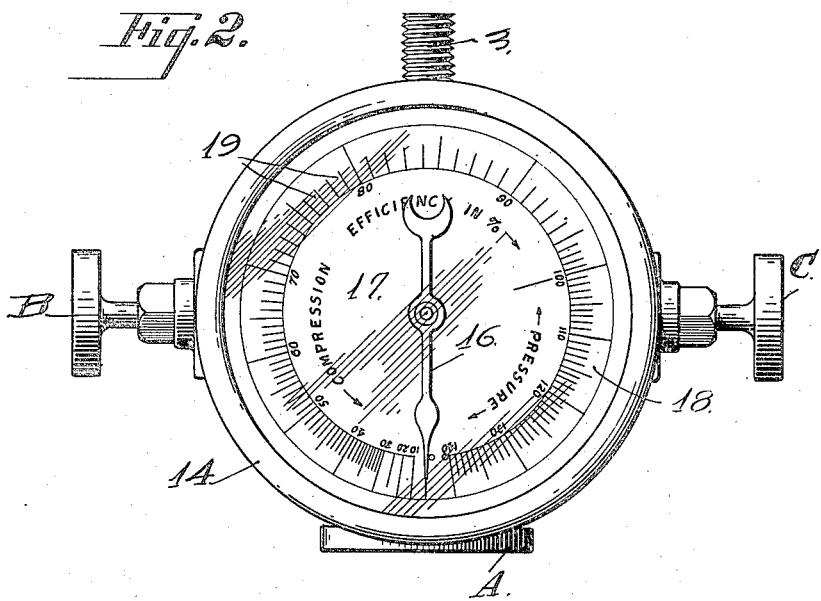
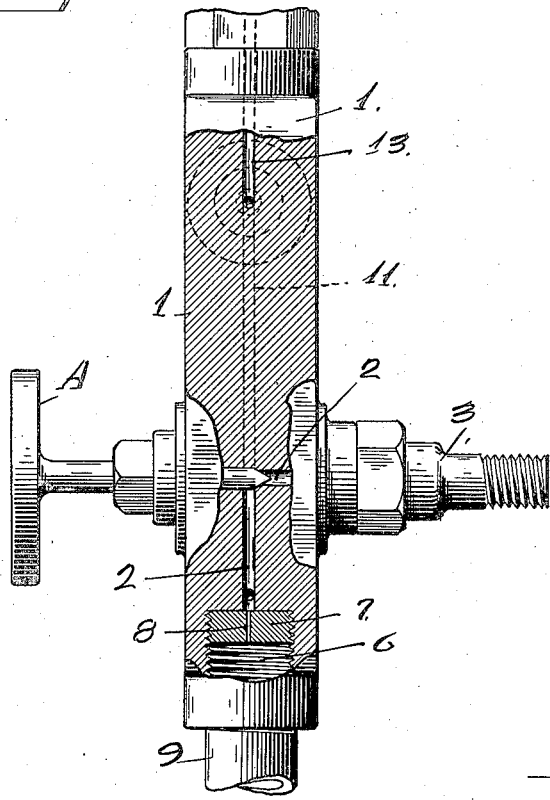
Inventor
Morris C. White
By Arthur L. Slee
Atty Patented Dec. 5, 1922.

1,437,830

UNITED STATES PATENT OFFICE.

MORRIS C. WHITE, OF SAN FRANCISCO, CALIFORNIA, ASSIGNOR, BY DIRECT AND MESNE ASSIGNMENTS, TO COMPRESSION-LOSS GAGE COMPANY OF ARIZONA.

COMPRESSION METER.

Application filed April 23, 1921. Serial No. 463,974.

*To all whom it may concern:*

Be it known that I, MORRIS C. WHITE, a citizen of the United States, residing in the city and county of San Francisco and State of California, have invented a new and useful Improvement in a Compression Meter, of which the following is a specification.

My invention relates to improvements in compression meters for testing the cylinders of internal combustion engines and the like to determine the loss of efficiency due to leakage from said cylinders, and is an improvement upon my copending application for a compression testing device, filed March 2nd, 1921, Serial No. 449,223, reference to which is hereby made.

Experience has shown that for making ordinary tests of engine cylinders such as are required for the general care and overhauling of an engine, the air pressure afforded by the ordinary air service system is sufficiently constant to give results approximating the exact value, as determined by my prior invention, closely enough to meet all practical requirements. It is, therefore, a primary object of my present invention to provide a device of the character described of a simplified construction.

A further object of my present invention is to provide a device arranged to shorten the time required for making cylinder tests.

Another object is to provide a more simple and therefore cheaper device.

A further object is to eliminate delicate adjustments and mechanism.

A still further object is to provide a construction whereby a single gage may be utilized for measuring the pressure of the air supply and the percentage loss due to leakage from the cylinders.

I accomplish these and other objects by means of the device disclosed in the drawings forming a part of the present specification wherein like characters of reference are used to designate similar parts throughout said specification and drawings, and in which:

Fig. 2 is a plan view of the device disclosed in Fig. 1;

Fig. 3 is a broken side elevation, parts being broken away and shown in section to disclose my improved construction;

Figure 1:
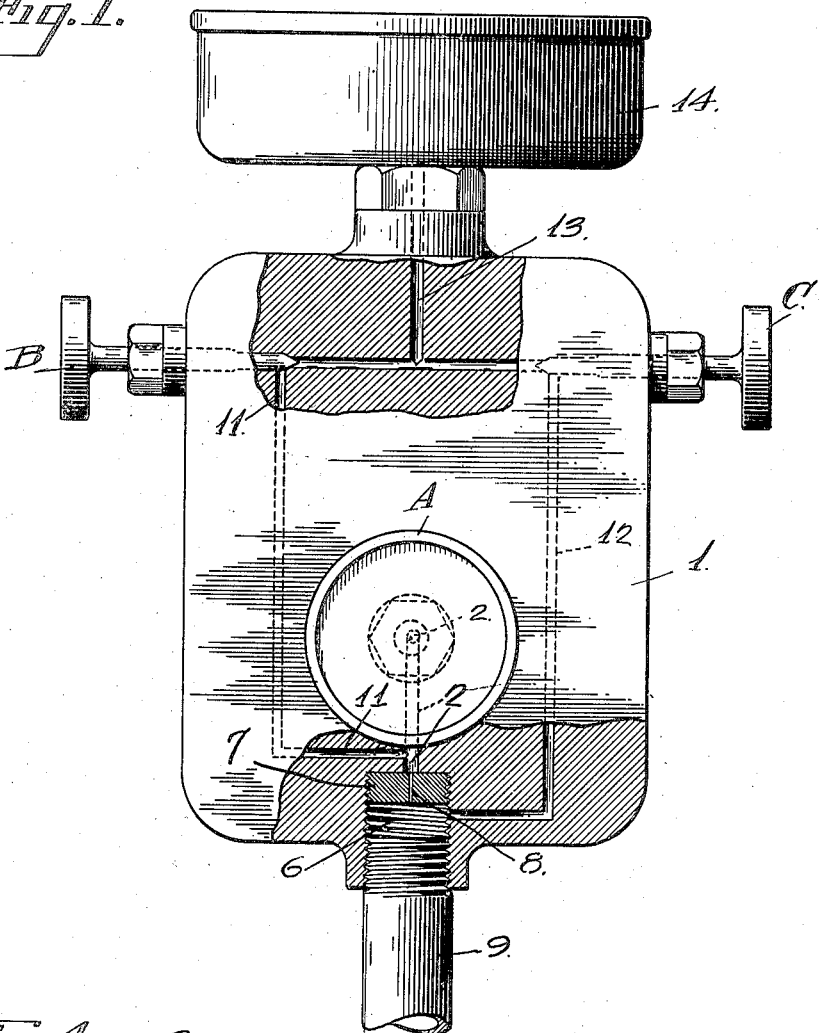
Fig. 1 is a broken front elevation partly in section.
Figure 4:
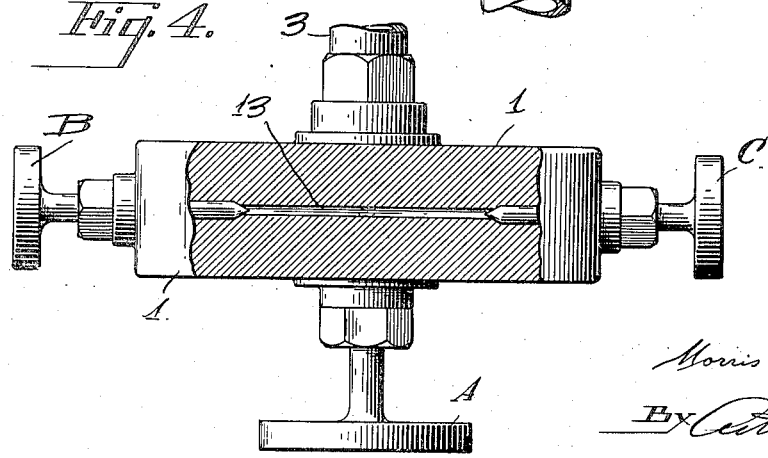
Fig. 4 is a broken plan view with the gage removed, parts being broken away and shown in section to disclose my gage passage control valves.

Referring to the drawings, my improved compression meter is seen to comprise a body portion 1 of any suitable shape and dimension provided with an air supply passage 2 adapted to receive air pressure through a connection 3 from an external source of pressure, not shown. A needle valve A is mounted upon the body 1 and arranged to control the supply of air pressure through the supply passage 2 for a purpose hereinafter more fully described.

The supply passage 2 has an enlarged portion 6 at the lower portion of the body 1, said enlarged portion 6 being threaded to receive a plug 7 provided with a restricted orifice 8 of calculated area for the passage of air into a connection 9 which is threaded into the lower end portion 6 to form a connection between the body 1 and a cylinder to be tested. The connection 9 is preferably arranged to be threaded into the opening ordinarily filled by the spark plug of a cylinder, but as the cylinder and the manner of connecting my device to the same forms no part of my pressent invention I have not disclosed these members in the drawings.

Gage passages 11 and 12 are provided in the body portion 1 and arranged to open into the supply passage 2 upon opposite sides of the orificed plug 7. The passages 11 and 12 extend upwardly through the body to a suitable pressure gage 14. Needle valves B and C are mounted upon the body 1 and are arranged to close the passages 11 and 12 respectively between the supply passage 2 and the gage 14. The upper portions of the passages 11 and 12 between the valves B and C may be combined to form a single passage 13 to the gage as disclosed in Fig. 1 of the drawings.

The gage 14 is provided with the usual indicator 16 and with a dial 17 calibrated to read in percentage efficiency as based upon a standard working pressure. In the dial illustrated the standard working pressure is assumed at 100 pounds per square inch. The calibrations 18 above 100, therefore, indicate pounds pressure in the line from the source of pressure. The calibrations 19 below 100 indicate the compressive efficiency. The working pressure of 100 pounds is an arbitrary value assumed for convenience, but any other value might be assigned and a corresponding percentage scale calibrated in accordance with such value if desired.

The operation of my improved compression meter is as follows: The body 1 having been connected with the cylinder to be tested and with the source of air pressure, the valve A is opened to admit air pressure into the supply passage 2, the valves B and C being closed. The air passes through the orifice 8 into the connection 9 and immediately builds up a pressure within the cylinder to be tested. The valve B is now opened to admit the air pressure above the orificed plug 7 into the gage 14, the supply pressure being indicated upon the calibrations 18 upon the upper portion of the scale. It is essential that the pressure within the passage 2 be above the standard working pressure assumed, namely 100 pounds in the case illustrated. The valve A is now partially closed thereby restricting the entrance of air pressure into the passage 2, the valve A being slowly manipulated until the pressure admitted is reduced to 100 pounds, as indicated by the indicator 16. The valve B is now closed and the valve C opened. The supply pressure will now be shut off from the gage and the pressure upon the cylinder side of the orifice 8 will now be indicated by the indicator 16 upon the calibrations 19. If the cylinder is perfect there will be no drop in pressure and the indicator 16 will remain stationary at the calibration marked 100. If there is any leakage from the cylinder either through the valves or past the piston, there will be a drop of pressure within the cylinder and the portion of the passage 2 on the cylinder side of the orifice 8. The orifice 8 is made of a calculated area to restrict the passage of air into the cylinder and the dial 17 calibrated in accordance with the orifice to indicate the relative efficiency of a cylinder in respect to a perfect cylinder from which there is no loss through leakage as compared with a cylinder from which the leakage is so great that the pressure introduced through the orifice 8 is entirely disseminated. In this manner a perfect cylinder will be indicated by a dial reading of 100% and the efficiency of any imperfect cylinder will be indicated in empirical percentage by the indicator 16 upon the calibrations 19 of the dial 17 which are graduated downwardly to a zero efficiency when the pressure is entirely lost through leakage.

The character of leakage around a piston may be determined by making tests as above described with the piston at different positions in the cylinder on the firing or compression stroke. If the loss is uniform at the several positions the leakage will be attributable to faulty piston rings. If the loss varies appreciably, the leakage will be due in part to scored cylinder walls.

Loss due to improperly seating valves may be determined by first testing the cylinder as above described and subsequently removing the connection 9 from the cylinder and placing a small quantity of oil or other viscous substance within the cylinder. The oil closes any leakage around the piston, and any loss indicated by a test made after the introduction of said oil will be due entirely to improperly seated valves.

As the air is admitted directly into the cylinder through the orifice 8 it requires but an instant of time to build up the pressure within the cylinder and to adjust the valve A to admit the standard testing pressure. A manipulation of the two valves B and C then gives a direct measure of the loss of pressure from the cylinder due to leakage. As the variation in any air pressure system during so short a period as required for making the above test is negligible, the result obtained is sufficiently accurate to meet all practical requirements.

Having thus described my invention, what I claim as new and desire to secure by Letters Patent is:

1. A compression meter adapted for connection with a cylinder to be tested comprising means having a restricted orifice; means connecting one side of said orifice with the cylinder; means connecting the other side of said orifice with a source of air pressure; and means for independently measuring the pressure upon each side of said orifice to indicate a reduction in pressure due to leakage from the cylinder.

2. A compression meter adapted for connection with a cylinder to be tested comprising means having a restricted orifice; means connecting one side of said orifice with the cylinder; means connecting the other side of said orifice with a source of air pressure; means for independently measuring the pressure upon each side of said orifice to indicate a reduction in pressure due to leakage from the cylinder; and means for regulating to a predetermined standard the air pressure supplied to said orifice.

3. A compression meter adapted for connection with a cylinder to be tested comprising means provided with a restricted orifice; means connecting one side of said orifice with the cylinder; means for connecting the other side of said orifice with a source of air pressure; a valve mounted between the orifice and the source of air pressure for regulating to a predetermined standard the pressure supplied to said orifice; and means for independently measuring the pressure upon each side of the orifice to indicate the reduction in pressure due to leakage from the cylinder.

4. A compression meter adapted for connection with a cylinder to be tested comprising a body portion provided with an air supply passage including a restricted orifice arranged to introduce air under pressure into said cylinder; and means for measuring independently the pressure within the supply passage upon each side of the orifice to indicate the reduction in pressure due to leakage from the cylinder.

5. In a device of the character described, a member having a restricted orifice and arranged to deliver air under pressure into a cylinder to be tested; and means for independently measuring the pressure upon each side of the orifice to indicate a reduction in pressure due to leakage from the cylinder.

6. In a device of the character described, a member having a restricted orifice and arranged to deliver air under pressure into a cylinder to be tested; means for independently measuring the pressure upon each side of the orifice to indicate a reduction in pressure due to leakage from the cylinder; and means for regulating to a predetermined standard the pressure supplied to said orifice.

7. A compression meter comprising a body portion provided with an air supply passage arranged to connect a cylinder to be tested with a source of air pressure, said supply passage including a restricted orifice for limiting the passage of air into said cylinder, said body portion being also provided with a pair of gage passages opening into the supply passage upon opposite sides of the restricted orifice; valve means for regulating to a predetermined standard the air pressure supplied to the restricted orifice; a gage operatively connected to the gage passages; and means for closing either of said gage passages independently whereby the pressure upon either side of the orifice may be measured to indicate a reduction in pressure due to leakage from the cylinder.

8. A compression meter comprising a body portion provided with an air supply passage and gage passages; a plug provided with a restricted orifice mounted within the air supply passage; means for connecting one end of said supply passage to a source of air under pressure; means for connecting the other end of said supply passage to a cylinder to be tested; a valve mounted between the orificed plug and the source of air pressure arranged to regulate to a predetermined standard the pressure supplied to the orifice; a gage operatively connected to the gage passages, said gage passages opening into the supply passage upon opposite sides of the orificed plug; and means for closing said gage passages independently whereby the pressure upon either side of the orifice may be measured to indicate a reduction in pressure due to leakage from the cylinder.

9. A compression meter comprising a body portion provided with an air supply passage and a pair of gage passages; means for connecting one end of the supply passage to a source of air under pressure; means for connecting the other end of said supply passage to a cylinder to be tested; a plug provided with a restricted orifice mounted within the supply passage; a valve mounted between the orificed plug and the source of air pressure arranged to regulate to a predetermined standard the pressure supplied to the orifice; a gage operatively connected to the gage passages, said gage passages opening into the supply passage upon opposite sides of the orificed plug; and valves mounted between the supply passage and the gage arranged to close the gage passages whereby the pressure upon either side of the orifice may be measured independently to indicate a reduction in pressure due to leakage from the cylinder.

In witness whereof I hereunto set my signature.

MORRIS C. WHITE.